United States Patent [19]

Greenwald et al.

[11] Patent Number: 5,476,826
[45] Date of Patent: Dec. 19, 1995

[54] PROCESS FOR PRODUCING CARBON BLACK HAVING AFFIXED NITROGEN

[75] Inventors: Anton C. Greenwald, North Andover; Vinod Jalan, deceased, late of Concord, both of Mass., by Radha Jalan, executrix

[73] Assignee: Gas Research Institute, Chicago, Ill.

[21] Appl. No.: 100,677

[22] Filed: Aug. 2, 1993

[51] Int. Cl.[6] .............................. B01J 37/34; B01J 21/18
[52] U.S. Cl. .............................. 502/180; 502/5; 502/101; 502/185
[58] Field of Search .............................. 502/5, 101, 180, 502/185

[56] References Cited

U.S. PATENT DOCUMENTS

| | | | |
|---|---|---|---|
| 1,064,211 | 6/1913 | Heil | 502/209 |
| 3,264,266 | 8/1966 | Merten et al. | 260/73 |
| 3,485,771 | 12/1969 | Horvath | 252/430 |
| 4,136,059 | 1/1979 | Jalan et al. | 252/447 |
| 4,137,373 | 1/1979 | Jalan et al. | 429/44 |
| 4,263,376 | 4/1981 | Blurton | 429/42 |
| 4,526,881 | 7/1985 | Binder et al. | 502/101 |
| 4,844,781 | 7/1989 | Sanchez et al. | 204/132 |
| 4,873,154 | 10/1989 | Yasunaga et al. | 428/694 |
| 5,238,888 | 8/1993 | Abe | 502/5 |

OTHER PUBLICATIONS

V. Jalan, Desai, M. and Vora R., Enhanced Catalytic Activity for $O_2$ Reduction in Phosphoric Acid Using Platinum Implanted Carbons, Extended Abstract, The Electrochemical Society, 89–1, 893, (1989).

V. Jalan, Desai, M., and Greenwald, A. C., N–Implanted Carbon Catalysts for Oxygen Reduction in Phosphoric Acid, Extended Abstracts, The Electrochemical Society, 89–1, 895, (1989).

M. Desai, Greenwald, A. and Jalan, V., Electrochemistry of Ion–Implanted Carbon Blacks, Extended Abstracts, Proceedings of the Electrochemical Society Meeting, Seattle, Wash., U.S.A., (1990).

V. Jalan, Preparation of Highly Dispersed Platinum and its Stabilization by Carbon, Extended Abstracts, Giner, Inc., Montreal, Canada, Meeting May 9–14, 1982.

*Primary Examiner*—Asok Pal
*Assistant Examiner*—Walter D. Griffin
*Attorney, Agent, or Firm*—Speckman, Pauley & Fejer

[57] ABSTRACT

A catalyst material of carbon black powder having nitrogen affixed to its surface and process for its production by contacting carbon black powder particles with a plasma or low energy beam of nitrogen containing ions affixing the nitrogen ions to the surface of the particles in a concentration of about 0.1 to about 10 percent, based upon the total number of surface atoms. The catalysts are particularly suited for use in phosphoric acid fuel cells.

15 Claims, 7 Drawing Sheets

PROCESS FOR PRODUCING CARBON BLACK HAVING AFFIXED NITROGEN

BACKGROUND OF THE INVENTION

1. Field of the Invention

This invention relates to a catalyst material of carbon black powder having nitrogen affixed to its surface suitable for use as a fuel cell catalyst support, particularly, acid resistant catalyst support for use in phosphoric acid fuel cells, and process for its production, and. The catalyst support of this invention is provided by affixing nitrogen to the surface of carbon black particles by contacting carbon black powder with nitrogen containing ions.

2. Description of Related Art

Improvement of cathode operating voltage and increase of cathode life in lithium sulfuryl chloride electrochemical cells by pretreatment of carbon black powder with acetone or methanol prior to cathode fabrication is known from U.S. Pat. No. 4,526,881.

Plasma activation of catalysts, such as chromium oxide for polymerization of ethylene, by passing an activating gas, such as air or nitrogen, through an electromagnetic field forming a plasma which is contacted with the catalyst at ambient or below temperature and pressure, is taught by U.S. Pat. No. 3,485,771.

Platinum ion implantation in carbon black by high energy ion beams to enhance the catalytic activity for oxygen reduction in phosphoric acid is taught by V. Jalan, Desai, M. and Vora R., Enhanced Catalytic Activity for $O_2$ Reduction in Phosphoric Acid Using Platinum Implanted Carbons, Extended Abstract, The Electrochemical Society, 891, 893, (1989). This paper teaches that catalytic activity by platinum ion implantation in carbon was greater than with chemically deposited platinum, and in the order of that of heat treatment of platinum supported on carbon. Ion implantation of nitrogen in carbon powder by a high energy nitrogen ion beam was shown to enhance oxygen reduction in phosphoric acid as compared to equivalent mass loadings of chemically deposited platinum by V. Jalan, Desai, M., and Greenwald, A. C., N-Implanted Carbon Catalysts for Oxygen Reduction in Phosphoric Acid, Extended Abstracts, The Electrochemical Society, 89-1, 895, (1989). Ion implantation of nitrogen and transition metals, such as platinum, in carbon blacks changes the crystal structure and the chemical composition of the carbon black target material is taught by M. Desai, Greenwald, A. and Jalan, V., Electrochemistry of Ion-Implanted Carbon Blacks, Extended Abstracts, Proceedings of the Electrochemical Society Meeting, Seattle, Wash., U.S.A., (1990). This paper teaches the corrosion resistance of nitrogen-implanted carbon black to be about an order of magnitude greater than non-implanted carbon black and postulated formation of C—N and Pt—C compounds due to the high energy of each atom which enables formation of unique chemical mixtures and atomic structures.

SUMMARY OF THE INVENTION

A major problem with phosphoric acid fuel cells has been their instability and degradation with continuous operation over time due to the effects of poisoning by fuel impurities and chemical attack of the catalyst support by the electrolyte. The problem of chemical attack of the catalyst support by the highly acidic phosphoric acid fuel cell environment is greatly reduced or eliminated by provision of an acid resistant catalyst support. Poisoning by fuel impurities is largely due to residual sulfur in the fuel attaching to the catalyst and forming sulfuric acid which attacks the catalyst support. Acid resistant catalyst support material also reduces this problem.

It is an object of this invention to provide improved catalyst support material which is acid resistant in oxidizing, highly acidic environments.

It is another object of this invention to provide fuel cell catalyst support material which is stable over long periods of operation of phosphoric acid fuel cells while providing enhanced catalyst activity exhibiting increased current density at all operating potentials.

It is an object of this invention to provide a process for pretreatment of the surface of carbon black powder, prior to electrode fabrication, by contact with nitrogen containing ions.

The above objects and other advantages of this invention which will become apparent upon reading the detailed description, are achieved by a catalyst support material of carbon black powder having nitrogen affixed to its surface. The surface affixed nitrogen according to the present invention does not modify the crystal or atomic structures of the target material, as does the higher energy implantation processes taught by the prior art. Immersion of the fine particulate catalyst support in a plasma containing nitrogen ions allows treatment of only the surface region of the carbon particles, compared to a bulk, in-depth treatment by ion implantation, so that a larger fraction of added nitrogen is chemically active as a catalyst since the catalytic reaction is a surface reaction. Further, the number of nitrogen ions available for reaction in the plasma treatment is significantly greater than the number available in a directed beam, thereby reducing processing time and cost. The process of this invention involves contacting carbon black powder with nitrogen containing ions which may be in the form of a nitrogen containing ion plasma or a low energy nitrogen containing ion beam to affix nitrogen containing ions to the surface of the powder particles. The carbon black powder having nitrogen containing ions affixed to the particle surface according to this invention may serve as a catalyst support to have platinum added and be formed into an electrode for use in phosphoric acid fuel cells. The terminology affixed as used in this description and claims means the nitrogen in added to the carbon black powder surface and less than about 5 atom layers below the surface and the crystal and atomic structure of the carbon black powder is unmodified by the nitrogen added to its surface.

BRIEF DESCRIPTION OF THE DRAWING

Further features of this invention will be apparent from the following detailed description of the invention read in conjunction with the drawing, wherein.

DESCRIPTION OF PREFERRED EMBODIMENTS

A variety of apparatus may be used for generation of and contacting nitrogen containing ions and carbon black powder according to this invention. Nitrogen containing ions may include $N^+$, $N_2^+$, or nitrogen containing molecules or molecule fragments, such as $NH_3^+$. Contacting of nitrogen containing ions and carbon black powder may be effected by contact of a plasma of nitrogen containing ions and the powder or by bombardment of the powder with an ion beam of nitrogen containing ions of relatively low energy. The ion energy in the beam is that which would cause an ion impacting upon a carbon particle to bury itself less than about 5 atom layers below the surface where the catalytic action of the nitrogen would be effective. Penetration of more than about 5 atom layers results in the catalytic effects of the nitrogen being negligible. This differentiates the process of this invention from ion implantation where ions impact the carbon particles at high energy, tunnel through and are present on the surface in small amounts only as a result of further ion damage which sputters away from the surface. Any known means of creating a nitrogen ion containing plasma or low energy nitrogen ion beam may be used, such as a magnetic field or an electric field or directly create the ions for contact with the carbon powder. The ion energy may be about 0.01 to about 1,000 eV, preferably about 1 to about 10 eV. This compares to ion implantation which uses ions having an ion energy of over about 5,000 eV, typically over about 25,000 eV which results in changes in crystal and atomic structure. Carbon black powders which are amorphous carbon particles, about 50 to about 200 Å in diameter and preferably about 75 to about 125 Å in diameter, are suitable for use in this invention. Suitable powders are commercially available, such as Vulcan XC-72 from Cabot Corporation or Black Pearls 2000 from Cabot Corporation. Concentrations of nitrogen containing ions on the surface of the carbon particles of about 0.1 to about 10 percent, preferably about 0.8 to about 2 percent are suitable for the catalyst supports of this invention.

The nitrogen containing ions may be formed and affixed to the surface of carbon black particles in a number of ways. In one embodiment, as shown schematically in FIG. 1, carbon black powder 20 is in vertically oriented cup 21. Cup 21 may be shaken, rotated or stirred by any suitable means, not shown, to achieve better contacting during processing. Above cup 21 is porous or mesh electrode 23 through which a plasma containing nitrogen ions may freely pass. Current electrode 24 is spaced above porous electrode 23 and connected to alternating current supply means 25 to create an alternating electric field across electrodes 23 and 24. Nitrogen containing gas is supplied by nitrogen containing gas supply means 26 to the space between electrodes 23 and 24 where nitrogen containing ion plasma is formed and then passes, as indicated by arrows 27, into vertical cup 21 for contact with carbon black powder 20. Cup 21 may be maintained at ground potential by grounding means 22 or may have a positive potential up to the maximum desired ion energy (100 volts) applied by voltage means 28, controlled by switch 29, to alter the average ion energy contacting the carbon black powder. The gas flow may be between 0.1 and 1,000 sccm (standard cubic centimeters per minute @ 1 atm. @ 20° C.), preferably about 1 to about 100 sccm. The temperature of the carbon during the contacting according to this invention is not critical and may be about −273° to over 2500° F. Processing time is between about 1 minute to about 8 or more hours, preferred time in the apparatus shown in FIG. 2 was about 4 hours. The length of processing time relates to how well the powder can be stirred so that about 90% of the carbon particles are exposed to the plasma. The amount of nitrogen passing through the chamber is not related to the amount of carbon black in the cup since a great excess of nitrogen atoms are used as compared to the number of carbon atoms on the powder surface. Nitrogen flow is adjusted to the minimum required to maintain a steady, uncontaminated discharge plasma. The electric field between the electrodes was not directly measured. Instead the RF power needed to be applied across the electrodes has been specified as about 100 to $10^5$ watts power square meter of planar surface area of electrodes 23 and 24, preferably about $10^3$ to about $10^4$ W/m². The RF frequency is about 100 Hz to about 10 GHz, preferably about 10 KHz to about 20 MHz. The pressure in the chamber in which the process is carried out is about $10^{-3}$ to about $10^3$ torr, preferably about 0.1 to about 1.0 torr. The process usually results in generation of heat which raises the temperature of the carbon black power, however, cooling may be applied to the processing zone to maintain the temperature at ambient or lower, or the processing zone may be allowed to increase in accordance with the reaction heat. The time of processing according to this invention will vary according to the strength of the activating field and the gas flow rate, but generally is in the order of 60 minutes to 240 minutes.

Figure 2:
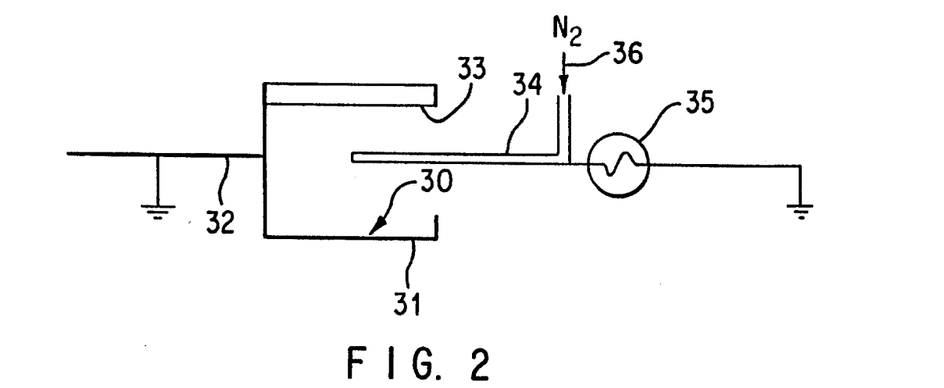

Another embodiment of a suitable apparatus for use in this invention is schematically shown in FIG. 2. Carbon black powder 30 is in horizontally oriented cup 31 having vanes 33 to mix the powder and enhance contact with nitrogen containing ions while cup 31 is rotated on a generally horizontal axis. Hollow current electrode 34 extends into cup 31 and introduces nitrogen containing gas from nitrogen containing gas supply means 36. Current electrode 34 is connected to alternating current supply means 35 to create an alternating electric field between electrode 34 and horizontal cup 31 forming nitrogen containing ion plasma which contacts tumbling carbon black particles as cup 31 is rotated.

Figure 3:
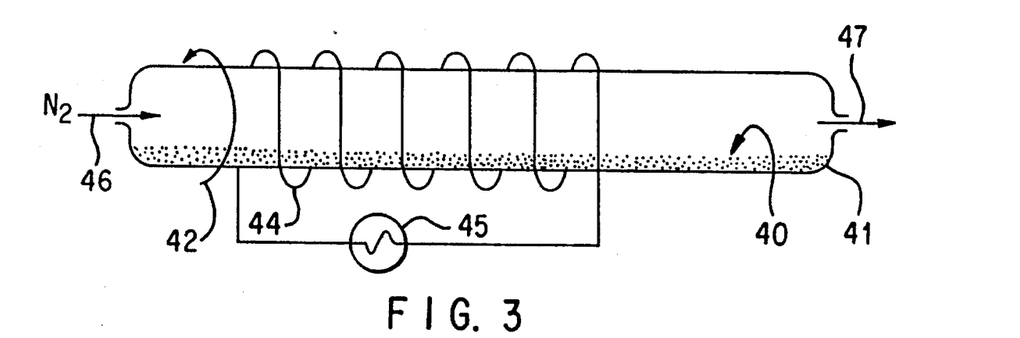

Another configuration of a suitable apparatus for use in this invention is schematically shown in FIG. 3. Carbon black powder 40 is in generally horizontally oriented cylinder 41 which may be rotated as indicated by arrow 42 by any suitable means, not shown. Nitrogen containing gas is introduced into cylinder 41 from nitrogen containing gas supply means 46 and exhausts through exhaust means 47. Current electrode 44 is shown as a spiral winding around the outside of cylinder 41 and is supplied an alternating current by AC supply means 45. Current electrode 44 may be of any suitable geometry to provide an electric field within cylinder 41. Cylinder 41 may be furnished with vanes and/or tilted so that carbon moves continuously from one end of the cylinder to the other to provide continuous processing of the carbon black powder. In this embodiment, the pressure inside of cylinder 41 is maintained sufficiently less than the pressure outside of the cylinder so that application of the alternating signal to current electrode 44 will preferentially create a nitrogen containing ion plasma within cylinder 41. In the same manner as previously described, the nitrogen containing ion plasma contacts the carbon black powder particles affixing nitrogen containing ions to their surface.

Figure 4:
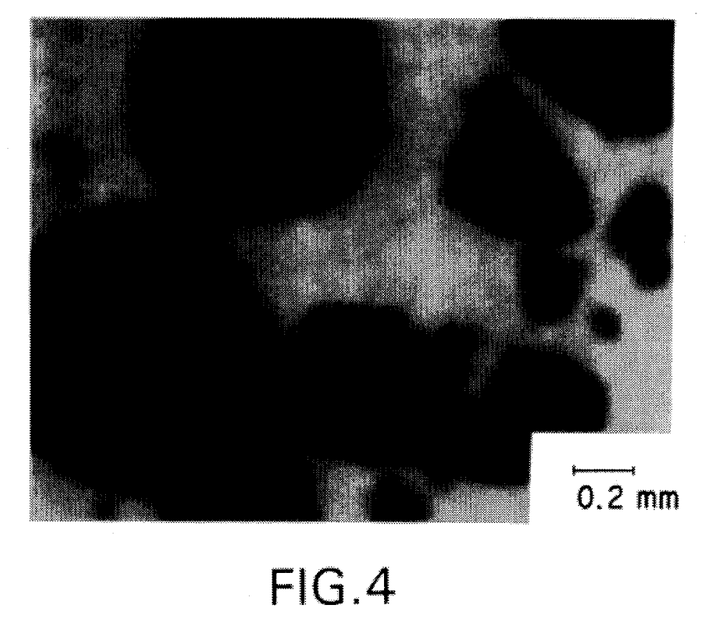
FIG. 4 is a photomicrograph of a catalyst support of this invention prepared without an agglomeration preventer.
Figure 5:
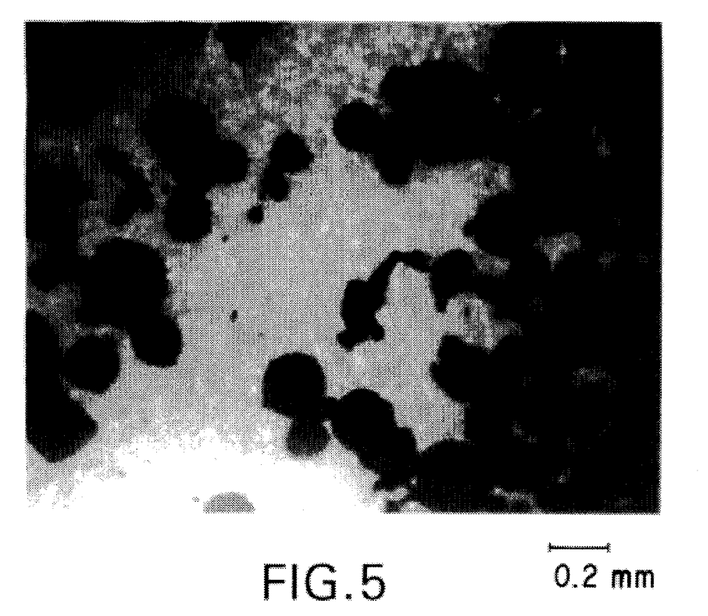
FIG. 5 is a photomicrograph of a catalyst support as prepared in FIG. 4 with an agglomeration preventer.

During processing, we have found that the carbon black powder tends to agglomerate as shown in the photomicrograph of FIG. 4. This undesired agglomeration can be alleviated by use of a physical agglomeration preventer, such as steel balls, ceramic balls, and the like, during processing. FIG. 5 is a photomicrograph of carbon black powder processed in an apparatus as shown in FIG. 2 in the identical fashion as the carbon black powder shown in FIG. 4 except that ⅛th inch diameter stainless steel ball bearings were added which effectively prevented and/or broke up agglomerates.

Figure 6:
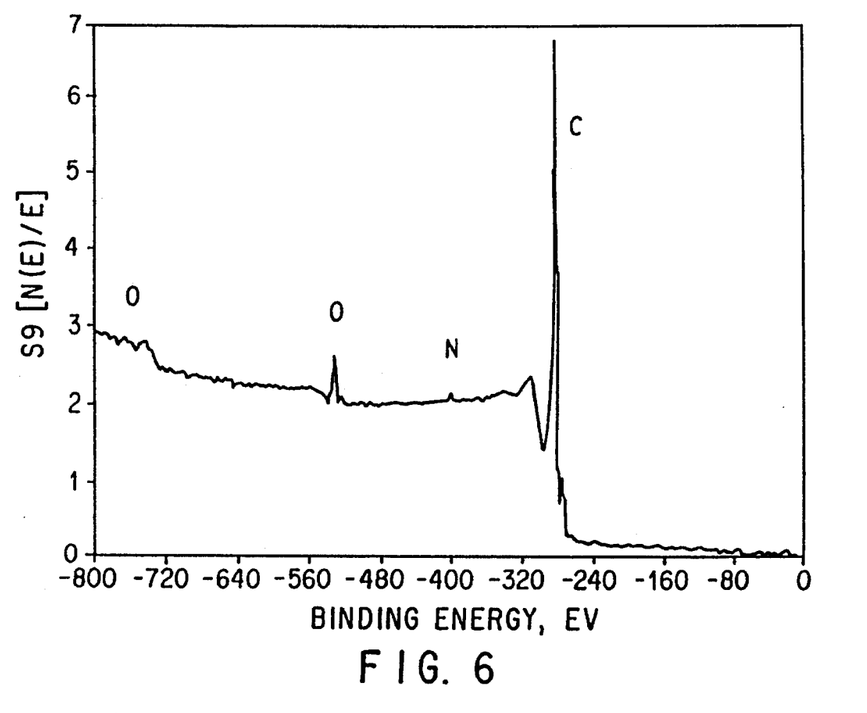
FIG. 6 shows the surface composition of untreated carbon black powder.
Figure 7:
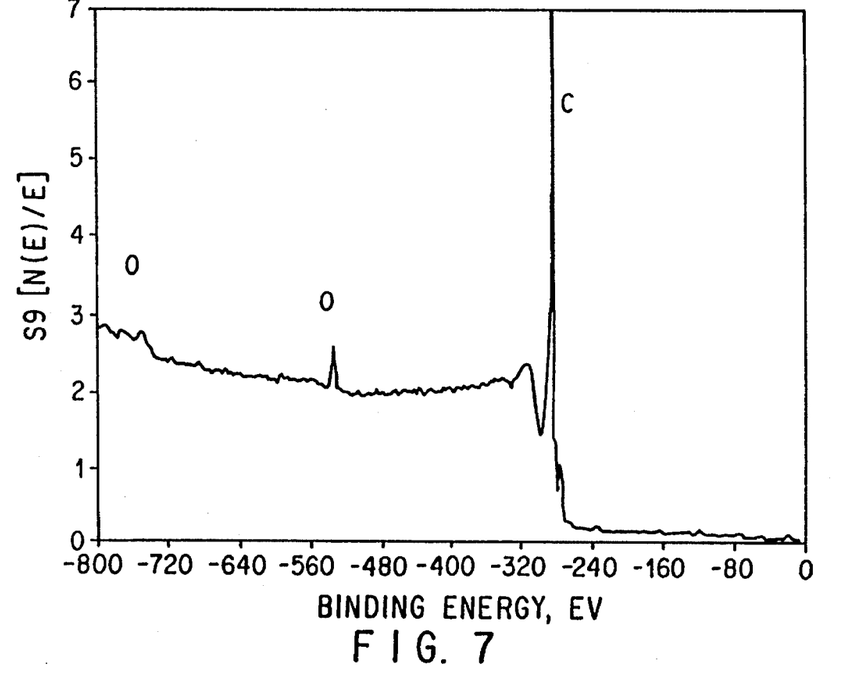
FIG. 7 shows the surface composition of carbon black powder treated according to this invention.

The exact nature of affixing of the nitrogen on the surface of the carbon black particles is not known. However, the plasma and low energy ion beam process of this invention does affix nitrogen to the surface of carbon black particles as shown in Example I. Nitrogen was not found on the carbon surface when the process was run without the plasma. The equivalent temperature at the point of impact between a 1 eV nitrogen ion and a carbon atom exceeds 10,000° C. This is well beyond the temperature which can be sustained in a "standard" non-plasma reactor. The extreme temperature allows unique action to occur which affix the nitrogen to the surface of the carbon particles. Consideration of nitrogen bonding to impurity sites is not acceptable since we have obtained nitrogen concentrations far in excess of impurity sites available in material used. FIGS. 6 and 7 would show impurities.

The following examples using specific materials and treatment conditions are set forth to exemplify this invention and should not be considered to limit the invention in any manner.

EXAMPLE I

Carbon black powder, Vulcan XC-72 obtained from the Cabot Corporation, was cleaned of absorbed atmospheric nitrogen by pumping in an evacuated chamber to low pressure, below $10^{-6}$ torr. The concentration of nitrogen on the surface of the cleaned carbon black powder was measured by electron spectroscopy for chemical analysis (ESCA) and the resulting spectrum, as shown in FIG. 7, did not show any nitrogen. ESCA is an established analysis method wherein the sample is placed in an evacuated chamber, typically below $10^{-6}$ torr, so that the surface is representative of the material and not species absorbed from residual gas in the vacuum chamber. The sample surface may be cleaned by low energy bombardment to remove one or two atom layers. The sample is irradiated with high energy gamma rays, absorption of these rays cause the atoms of the sample to become excited in that some of the electrons of the atoms now reside in metastable high energy states. As the electrons drop down to stable ground levels, the atoms may emit electrons of characteristic energies. The emitted electrons, called auger electrons, which are emitted from the top layer of atoms in the material may escape the surface of the solid. These are captured by a detector which can discriminate between electrons of different energies. Thus, the electron energy detected is an absolute indicator of the presence of a particular element, and the rate of emitted electrons is an indicator of that element to others in the solid material surface. The absence of a nitrogen signal in FIG. 7 indicates that the amount of nitrogen in the surface atom layer is less the 0.1% of the total number of atoms on the surface.

Figure 1:
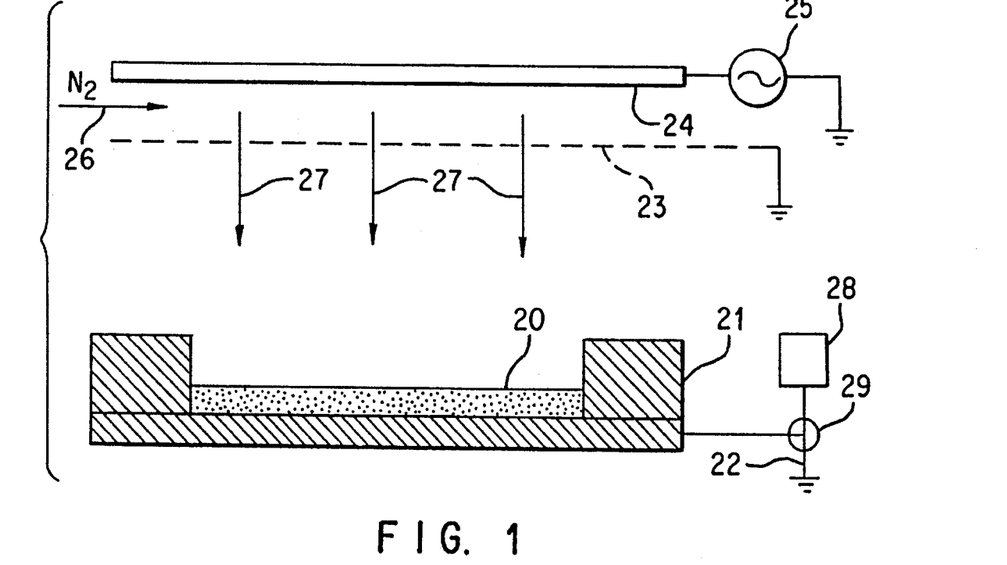
FIGS. 1–3 are simplified schematic illustrations of suitable apparatus for conduct of the process of this invention.

Another portion (20 cc) of the cleaned carbon black powder was contacted with a nitrogen ion containing plasma in the apparatus shown in FIG. 1. The background pressure was 0.3 torr of nitrogen with a total flow of gas of 10 sccm. The total processing time was 5 hours, but the apparatus was turned off for 5 minutes every hour to stir the powder. The applied RF signal to electrode 25 was 200 watts over a diameter of 150 mm. The nitrogen ion containing plasma treated carbon black powder was measured by ESCA in the same manner as described above. The resulting spectra, as shown in FIG. 6, shows a clear nitrogen signal indicating nitrogen affixed to the surface of carbon black particles in an amount of about 1 percent nitrogen, the number of nitrogen atoms on the surface as compared to the total number of the atoms on the surface.

EXAMPLE II

Figure 10:
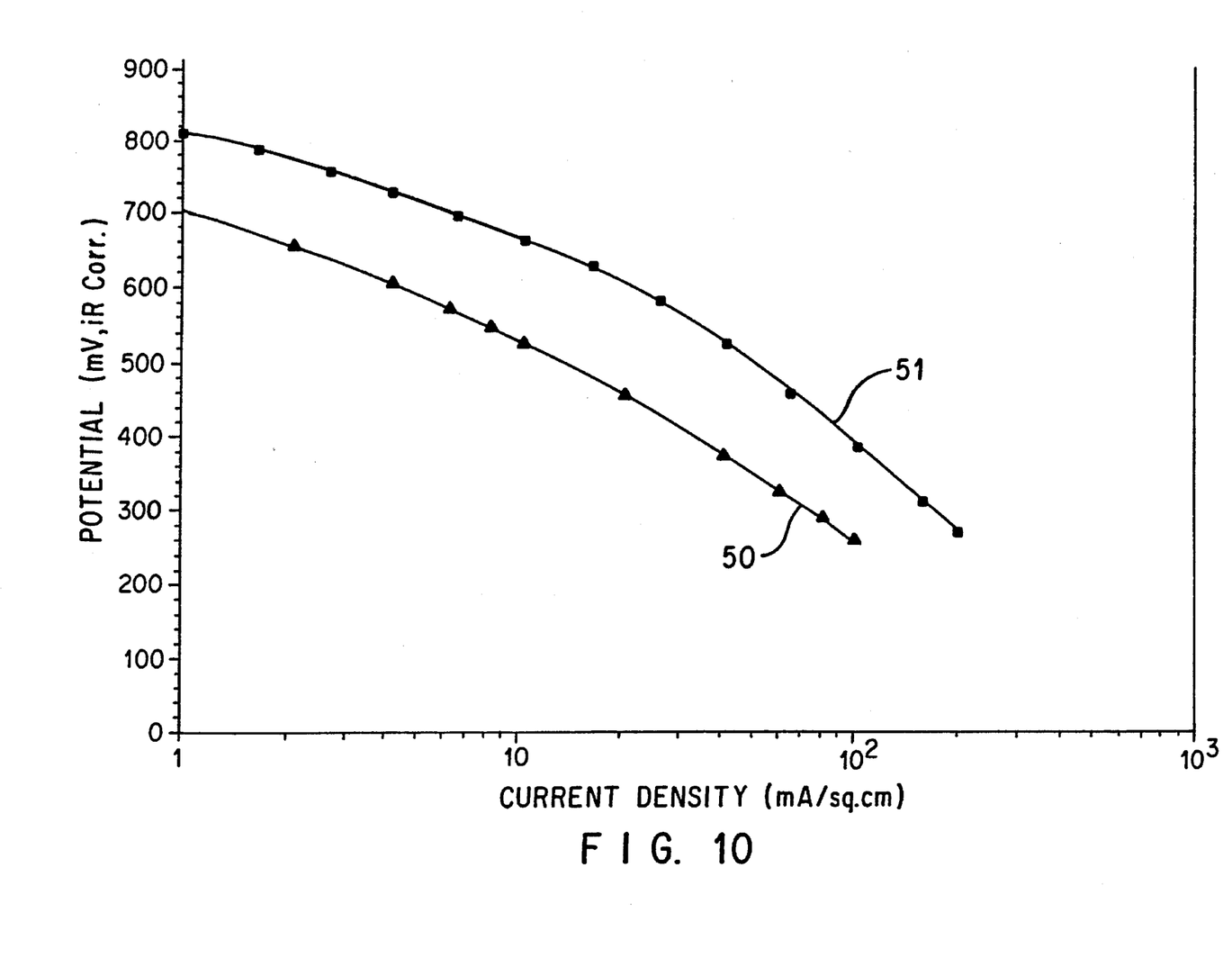
FIG. 10 shows the voltage induced in electrodes of untreated carbon black and an electrode of nitrogen plasma treated carbon black powder according to this invention.

Nitrogen was affixed to Vulcan XC-72 carbon black particles in the apparatus shown in FIG. 2. Approximately 20 cc of the carbon powder was placed in aluminum cup 30 which was grounded and rotated by shaft 32 at about 10 rpm. The carbon powder was mixed by vanes 33. One dozen stainless steel ball bearings, ⅛ inch diameter were mixed into the carbon powder to prevent clumping (FIG. 4) and to retain the particles small (FIG. 5). The entire apparatus was placed in an evacuated chamber where the pressure was maintained at 0.3 torr. Nitrogen gas was fed to the chamber through a conductive central axis tube 34 at a rate of 10 sccm. A high frequency, 1.8 MHz, signal was applied to central axis tube 34, 200 watts total power. The powder was processed for 4 hours. The amount of nitrogen affixed to the carbon powder, determined by ESCA as shown in FIG. 6, was about 1.5% atomic concentration. A portion of the carbon black powder with affixed nitrogen was fabricated into an electrode for a phosphoric acid fuel cell in a process described by Vinod Jalan, Abstract No. 356, Extended Abstracts, Volume 82-1, Electrochemical Society, 1982, except without platinum. Briefly, the carbon black powder was dispersed into an aqueous solution with small Teflon particles. A graphite electrode was coated with this solution by immersing it into a tank and then drying it. After drying, the electrode was heated under pressure between two flat surfaces and the Teflon softens fusing the carbon particles to the electrode. This electrode was tested for catalytic activity in a half cell with 100% $H_3PO_4$ at 200° C. using pure oxygen. FIG. 10 shows polarization scan of half cell data by the voltage induced in an electrode as a function of current density drawn through the sample electrode. Curve 50 shows the data from an untreated carbon black powder electrode and curve 51 shows the improvement achieved with the carbon black powder electrode with nitrogen affixed.

EXAMPLE III

Figure 11:
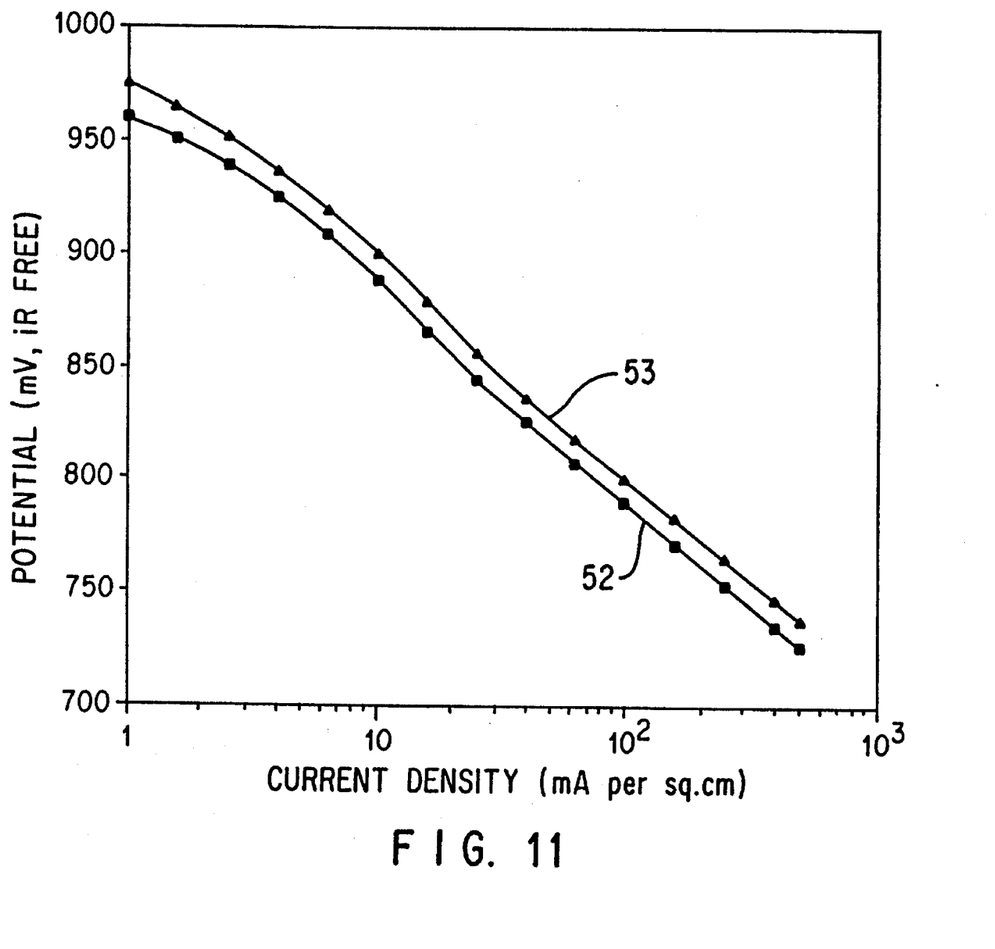
FIG. 11 shows the voltage induced in electrodes as in FIG. 10 with chemically deposited platinum.

Carbon electrodes with and without nitrogen affixed, as described in Example II, were treated with platinum as described in U.S. Pat. Nos. 4,137,373 and 4,136,059. Briefly, an amount of platinum equal to 10% of the weight of the total carbon black powder was added the aqueous solution as described in Example II. The resulting relative atomic concentration of platinum on the surface of the carbon black particles was about 30%, compared to the 1% for nitrogen affixed to the electrode material. The same data as described in Example II was obtained for this electrode and is shown in FIG. 11. Curve 52 shows to data from an electrode with platinum chemically deposited on untreated carbon black powder and curve 53 shows the improvement achieved with the carbon black powder with nitrogen affixed. It should be noted that FIG. 11 is drawn to a different scale than FIG. 10 and shows much higher catalytic activity, with the nitrogen affixed to the carbon black powder being superior in both instances.

EXAMPLE IV

Figure 8:
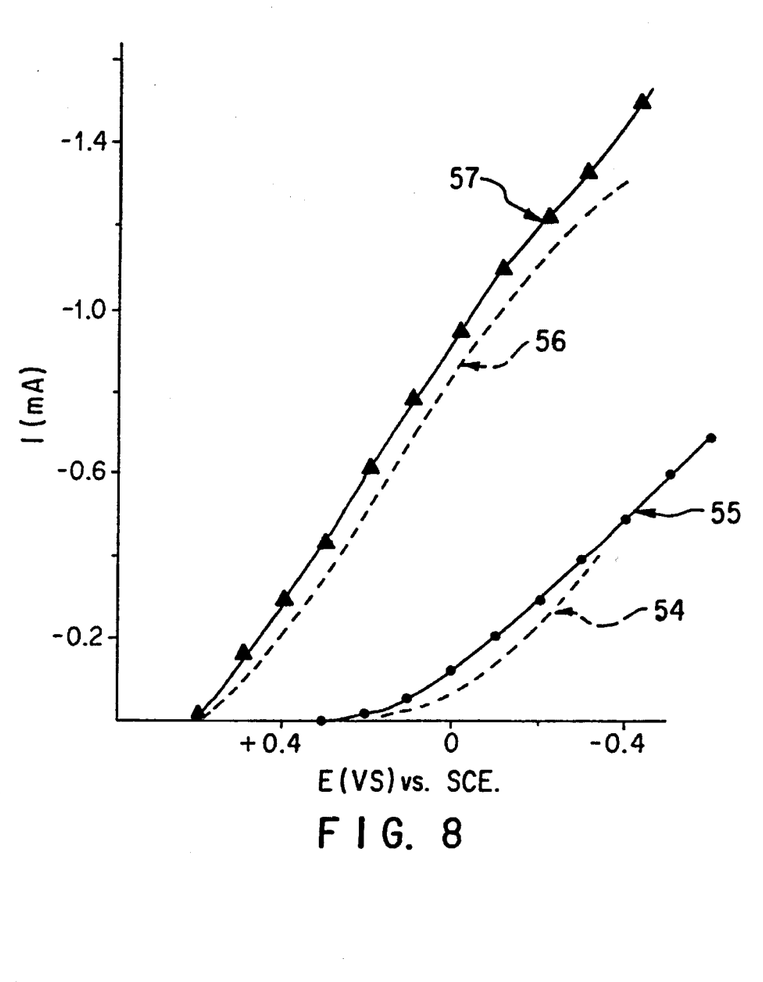
FIG. 8 shows increased current density at various potentials in phosphoric acid using electrodes formed of nitrogen plasma treated carbon black powder according to this invention.

Electrodes were formed as described in Examples II and III: untreated carbon black electrodes; electrodes from carbon black powder having nitrogen affixed; 10 weight percent platinum on untreated carbon black electrodes; and 10 weight percent platinum on electrodes from carbon black powder having nitrogen affixed. Each of these electrodes was used in a rotating disk test and the results in 100 percent $H_3PO_4$ are shown in FIG. 8 wherein curve 54 shows data from the untreated electrode; curve 55 shows data from the electrode having nitrogen affixed; curve 56 shows data from the untreated electrode with platinum; and curve 57 shows data from the electrode with carbon black powder having nitrogen affixed and with platinum. These curves clearly show the superiority of the carbon black powder with nitrogen affixed in a highly acidic environment.

EXAMPLE V

Figure 9:
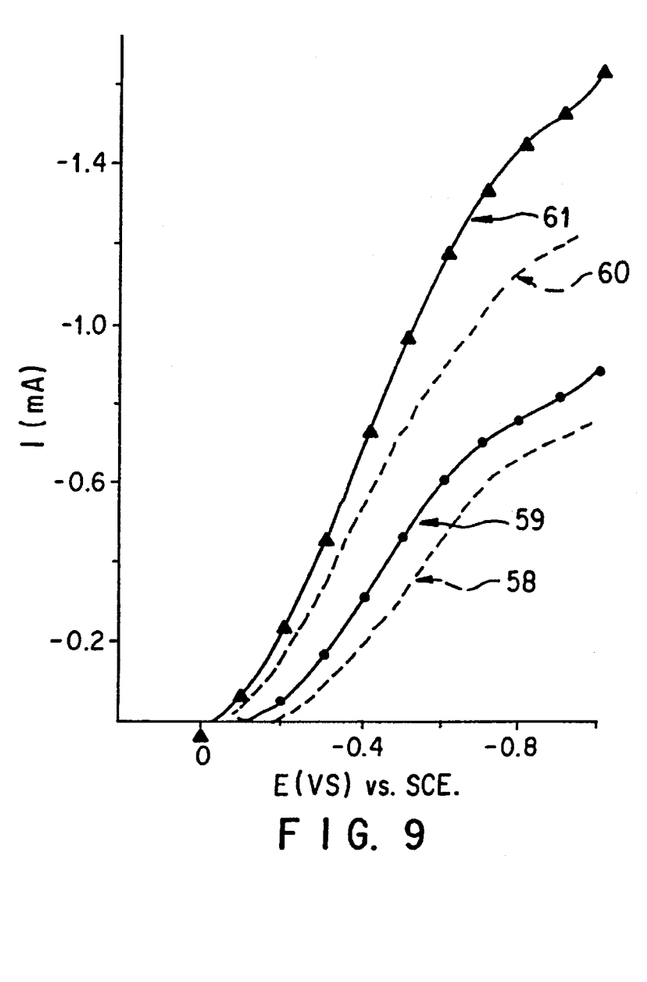
FIG. 9 shows increased current density at various potentials in sodium hydroxide using electrodes formed of nitrogen plasma treated carbon black powder according to this invention.

Electrodes made in the same manner as described in Example IV were used in rotating disk test in the same manner as described in Example IV except that it was conducted in an NaOH solution, 0.1 molar concentration, oxygen saturated. The results are shown in FIG. 9 wherein curve 58 shows data from the untreated electrode; curve 59 shows data from the electrode having nitrogen affixed; curve 60 shows data from the untreated electrode with platinum; and curve 61 shows data from the electrode from carbon black powder having nitrogen affixed and with platinum. These curves clearly show the superiority of the carbon black powder with nitrogen affixed in a highly basic environment.

EXAMPLE VI

Figure 12:
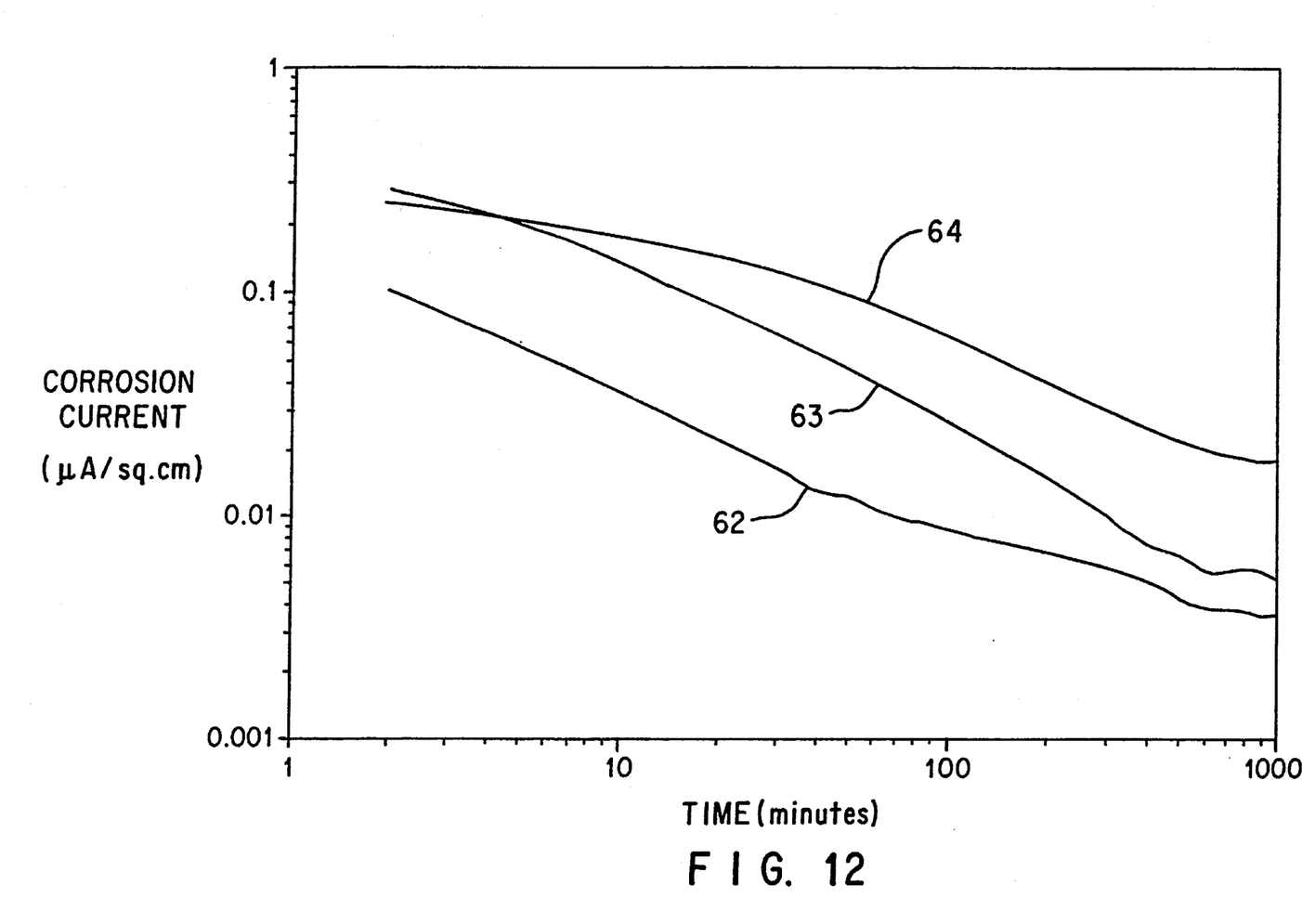
FIG. 12 shows the oxidation currents for electrodes of untreated carbon black powder, high temperature treated carbon black powder, and nitrogen plasma treated carbon black powder according to this invention.

Electrodes were made from Vulcan XC-72 carbon black powder on gold mesh in the following manner: using carbon powder as received; using carbon powder heated to 2700° C.; and using carbon powder with affixed nitrogen as prepared in Example II, except that gold mesh was used to support the carbon powder bonded by Teflon, instead of carbon paper or graphite. The corrosion current, that collected by the sample adjusted for surface area when a potential of 1 volt relative to a reversible hydrogen electrode was applied, for each of these electrodes in 100% phosphoric acid at 200° C. for 1000 minutes was determined. The corrosion currents are shown in FIG. 12 wherein: curve 64 shows the electrode from carbon powder as received; curve 63 shows the electrode from carbon powder subjected to heat treatment; and curve 62 shows the electrode from carbon powder with affixed nitrogen. FIG. 12 clearly shows the improved acid resistance of the electrode fabricated from the carbon powder with affixed nitrogen.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of the invention.

We claim:

1. A process for production of catalyst material comprising contacting carbon black powder particles with nitrogen containing ions having an ion energy of about 0.01 to about 1,000 eV affixing said nitrogen to the surface and less than about 5 atom layers below said surface of said carbon black powder particles, the crystal and atomic structure of said carbon black powder unmodified by said nitrogen affixed to its surface.

2. A process for production of catalyst material according to claim 1 wherein said nitrogen ions are extracted from a nitrogen plasma produced by an alternating electric field.

3. A process for production of catalyst material according to claim 1 wherein said nitrogen ions are extracted from a nitrogen plasma produced by an alternating magnetic field.

4. A process for production of catalyst material according to claim 1 wherein said carbon black powder particles are agitated by tumbling or shaking to expose greater surface area to said nitrogen ions.

5. A process for production of catalyst material according to claim 4 wherein much larger inert particles are added to said carbon black powder particles to prevent agglomeration of said carbon black powder particles.

6. A process for production of catalyst material according to claim 1 wherein said nitrogen containing ions are selected from the group consisting of $N^+$, $N_2^{30}$, and $NH_3^+$.

7. A process for production of catalyst material according to claim 1 wherein said ion energy is about 1 to about 10 eV.

8. A process for production of catalyst material according to claim 1 wherein said carbon black powder particles are about 50 to about 200 Å A in diameter.

9. A process for production of catalyst material according to claim 1 wherein said carbon black powder particles are about 75 to about 125 Å A in diameter.

10. A process for production of catalyst material according to claim 1 wherein a pressure of about $10^{-3}$ to about $10^3$ torr is maintained in the region of said contacting.

11. A process for production of catalyst material according to claim 1 wherein a pressure of about 0.1 to about 1 torr is maintained in the region of said contacting.

12. A process for production of catalyst material according to claim 1 wherein said contacting is maintained for sufficient time to affix nitrogen on the surface of said carbon black powder particles in a concentration of about 0.1 to about 10 percent, based upon the total number of surface atoms.

13. A process for production of catalyst material according to claim 1 wherein said contacting is maintained for sufficient time to affix nitrogen on the surface of said carbon black powder particles in a concentration of about 0.8 to about 2 percent, based upon the total number of surface atoms.

14. A process for production of catalyst material according to claim 1 wherein said nitrogen containing ions are selected from the group consisting of $N^+$, and $N_2^+$ and $NH_3^+$ and are extracted from a nitrogen plasma, said ion energy is about 1 to about 10 eV, said carbon black particles are about 75 to about 125 Å A in diameter, a pressure of about 0.1 to about 1 torr is maintained in the region of said contacting, and said contacting is maintained for a sufficient time to affix nitrogen on the surface of said carbon black powder particles in a concentration of about 0.8 to about 2 percent, based upon the total number of surface atoms.

15. A process for production of catalyst material according to claim 1 additionally comprising contacting carbon black powder particles having nitrogen affixed to their surface with platinum in a manner to add platinum ions to their surface.

* * * * *

UNITED STATES PATENT AND TRADEMARK OFFICE
CERTIFICATE OF CORRECTION

PATENT NO. : 5,476,826

DATED : December 19, 1995

INVENTOR(S) : Anton C. GREENWALD and Vinod JALAN, deceased

It is certified that error appears in the above-identified patent and that said Letters Patent is hereby corrected as shown below:

Column 8, line 35,

Claim 6, line 3, delete "$N_2 30$" and in its place insert --$N_2^+$--.

Col. 8, line 40,

Claim 8, line 3, delete "200 $\overset{c}{A}$ A" and in its place insert --200 $\overset{o}{A}$--.

Col. 8, line 43, delete "125 $\overset{o}{A}$ A" and in its place insert --125 $\overset{c}{A}$--.

Signed and Sealed this

Twenty-sixth Day of March, 1996

Attest:

BRUCE LEHMAN

*Attesting Officer*     Commissioner of Patents and Trademarks